US008582917B2

(12) United States Patent
Chao

(10) Patent No.: US 8,582,917 B2
(45) Date of Patent: Nov. 12, 2013

(54) DATA CONVERSION METHOD AND DATA CONVERSION DEVICE

(75) Inventor: Tzu-Yi Chao, Hsinchu (TW)

(73) Assignee: Pixart Imaging Inc., Hsinchu (TW)

(*) Notice: Subject to any disclaimer, the term of this patent is extended or adjusted under 35 U.S.C. 154(b) by 820 days.

(21) Appl. No.: 12/815,951

(22) Filed: Jun. 15, 2010

(65) Prior Publication Data

US 2011/0194786 A1 Aug. 11, 2011

(30) Foreign Application Priority Data

Feb. 5, 2010 (TW) .............................. 99103575 A

(51) Int. Cl.
G06T 1/60 (2006.01)
G06T 3/00 (2006.01)

(52) U.S. Cl.
USPC ........... 382/276; 382/277; 382/293; 382/305; 358/403; 345/530; 345/531; 345/534; 345/545

(58) Field of Classification Search
CPC ..... G06T 1/60; G06T 3/00; H04N 2201/3226
USPC .................. 382/276, 277, 305, 293; 358/403; 345/530, 531, 534, 545
See application file for complete search history.

(56) References Cited

U.S. PATENT DOCUMENTS 5,884,016 A * 3/1999 Allen et al. .................... 345/419
6,924,809 B2 8/2005 Chao et al.
7,170,521 B2 * 1/2007 Chylla .......................... 345/543
7,376,279 B2 * 5/2008 Dekel et al. ................... 382/240
2007/0101244 A1 5/2007 Haustein et al.
2009/0295790 A1 12/2009 Pockett

FOREIGN PATENT DOCUMENTS

TW 516008 B 1/2003
TW 200818925 A 4/2008

OTHER PUBLICATIONS

Daylight et al., "Memory-Access-Aware Data Structure Transformations for Embedded Software With Dynamic Data Accesses", IEEE Transactions on Very Large Scale Integration (VLSI) Systems, vol. 12, No. 3, Mar. 2004, pp. 269-280.*
Intellectual Property Office, Ministry of Economic Affairs, R.O.C., "Office Action", Jan. 14, 2013, Taiwan.

* cited by examiner

Primary Examiner — Matthew Bella
Assistant Examiner — Jose M Torres
(74) Attorney, Agent, or Firm — Morris Manning & Martin LLP; Tim Tingkang Xia, Esq.

(57) ABSTRACT

A data conversion method and a data conversion device convert a large cubic three-dimensional image data to a plurality of pieces of small cubic one-dimensional image data, or convert a plurality of pieces of small cubic one-dimensional image data to a large cubic three-dimensional image data. The data conversion method includes the following steps, marking a three-dimensional index on three-dimensional image data; converting the three-dimensional index to a writing sequence index; inputting the three-dimensional image data to a buffer memory in sequence according to the writing sequence index; computing a reading sequence index according to the writing sequence index; outputting data blocks from the buffer memory in sequence according to the reading sequence index. Through the method and the device, use of the memory is reduced, and time for conversion is lowered.

16 Claims, 9 Drawing Sheets

| $I_1(1)$ | $I_1(2)$ | $I_1(3)$ | ... | ... | ... | ... | $I_1(20)$ |
|---|---|---|---|---|---|---|---|
| $I_1(21)$ | $I_1(22)$ | $I_1(23)$ | ... | ... | ... | ... | ... |
| $I_1(41)$ | $I_1(42)$ | $I_1(43)$ | ... | ... | ... | ... | ... |
| ... | ... | ... | ... | ... | ... | ... | ... |
| ... | ... | ... | ... | ... | ... | ... | ... |
| $I_1(181)$ | $I_1(182)$ | $I_1(183)$ | ... | ... | ... | ... | $I_1(200)$ |

FIG. 5A

| $O_1(1)$ | $I_1(2)$ | $I_1(3)$ | ... | ... | ... | ... | $I_1(20)$ |
|---|---|---|---|---|---|---|---|
| $O_1(2)$ | $I_1(22)$ | $I_1(23)$ | ... | ... | ... | ... | ... |
| $O_1(3)$ | $I_1(42)$ | $I_1(43)$ | ... | ... | ... | ... | ... |
| ... | ... | ... | ... | ... | ... | ... | ... |
| ... | ... | ... | ... | ... | ... | ... | ... |
| $I_1(181)$ | $I_1(182)$ | $I_1(183)$ | ... | ... | ... | ... | $I_1(200)$ |

FIG. 5B

| $I_2(1)$ | $I_1(2)$ | $I_1(3)$ | ... | ... | ... | ... | $I_1(20)$ |
|---|---|---|---|---|---|---|---|
| $I_2(2)$ | $I_1(22)$ | $I_1(23)$ | ... | ... | ... | ... | ... |
| $O_1(3)$ | $I_1(42)$ | $I_1(43)$ | ... | ... | ... | ... | ... |
| ... | ... | ... | ... | ... | ... | ... | ... |
| ... | ... | ... | ... | ... | ... | ... | ... |
| $I_1(181)$ | $I_1(182)$ | $I_1(183)$ | ... | ... | ... | ... | $I_1(200)$ |

FIG. 5C

| $I_2(1)$ | $I_2(11)$ | $I_2(21)$ | ... | ... | ... | ... | $I_1(20)$ |
|---|---|---|---|---|---|---|---|
| $I_2(2)$ | $I_2(12)$ | $I_2(22)$ | ... | ... | ... | ... | ... |
| $I_2(3)$ | $I_2(13)$ | $O_1(23)$ | ... | ... | ... | ... | ... |
| ... | ... | ... | ... | ... | ... | ... | ... |
| ... | ... | ... | ... | ... | ... | ... | ... |
| $I_2(10)$ | $I_2(20)$ | $I_2(183)$ | ... | ... | ... | ... | $I_1(200)$ |

FIG. 5D

| $DI_1(1)$ | $DI_1(2)$ | $DI_1(3)$ | ... | ... | ... | $DI_1(10)$ |
|---|---|---|---|---|---|---|
| $DI_1(11)$ | $DI_1(12)$ | $DI_1(13)$ | ... | ... | ... | $DI_1(20)$ |
| $DI_1(21)$ | $DI_1(22)$ | $DI_1(23)$ | ... | ... | ... | $DI_1(30)$ |
| ... | ... | ... | ... | ... | ... | ... |
| ... | ... | ... | ... | ... | ... | ... |
| $DI_1(191)$ | $DI_1(192)$ | $DI_1(193)$ | ... | ... | ... | $DI_1(200)$ |

| $DO_1(1)$ | $DI_1(2)$ | $DI_1(3)$ | ... | ... | ... | $DI_1(10)$ |
|---|---|---|---|---|---|---|
| $DO_1(2)$ | $DI_1(12)$ | $DI_1(13)$ | ... | ... | ... | $DI_1(20)$ |
| $DO_1(3)$ | $DI_1(22)$ | $DI_1(23)$ | ... | ... | ... | $DI_1(30)$ |
| ... | ... | ... | ... | ... | ... | ... |
| ... | ... | ... | ... | ... | ... | ... |
| $DI_1(191)$ | $DI_1(192)$ | $DI_1(193)$ | ... | ... | ... | $DI_1(200)$ |

FIG. 8B

| $DI_2(1)$ | $DI_1(2)$ | $DI_1(3)$ | ... | ... | ... | $DI_1(10)$ |
|---|---|---|---|---|---|---|
| $DI_2(2)$ | $DI_1(12)$ | $DI_1(13)$ | ... | ... | ... | $DI_1(20)$ |
| $DO_1(3)$ | $DI_1(22)$ | $DI_1(23)$ | ... | ... | ... | $DI_1(30)$ |
| ... | ... | ... | ... | ... | ... | ... |
| ... | ... | ... | ... | ... | ... | ... |
| $DI_1(191)$ | $DI_1(192)$ | $DI_1(193)$ | ... | ... | ... | $DI_1(200)$ |

FIG. 8C

| $DI_2(1)$ | $DI_2(11)$ | $DI_2(21)$ | ... | ... | ... | $DI_1(10)$ |
|---|---|---|---|---|---|---|
| $DI_2(2)$ | $DI_2(12)$ | $DI_2(22)$ | ... | ... | ... | $DI_1(20)$ |
| $DI_2(3)$ | $DI_2(13)$ | $DO_1(23)$ | ... | ... | ... | $DI_1(30)$ |
| ... | ... | ... | ... | ... | ... | ... |
| ... | ... | ... | ... | ... | ... | ... |
| $DI_2(10)$ | $DI_2(20)$ | $DI_1(193)$ | ... | ... | ... | $DI_1(200)$ |

FIG. 8D

DATA CONVERSION METHOD AND DATA CONVERSION DEVICE

CROSS-REFERENCE TO RELATED APPLICATIONS

This non-provisional application claims priority under 35 U.S.C. §119(a) on Patent Application No(s). 099103575 filed in Taiwan, R.O.C. on Feb. 5, 2010, the entire contents of which are hereby incorporated by reference.

BACKGROUND OF THE INVENTION

1. Field of the Invention

The present invention relates to a data conversion method and a data conversion device, and more particularly to a data conversion method and a data conversion device for three-dimensional images.

2. Related Art

A three-dimensional image capture device may be used to capture three-dimensional images in a space. The captured three-dimensional images may be stored or transmitted after being digitalized.

The three-dimensional image capture device and relevant techniques may be used in medicine, security, disaster relief, and other public welfare purposes, or in distant video transmission, audio visual entertainment, and other daily life purposes. The technique has a wide application scope.

Generally, the three-dimensional image captured by the three-dimensional image capture device has high dimensions, such that the image has a larger data volume, resulting in inconvenience in transmission or storage. Therefore, a three-dimensional image compression device is required to compress the three-dimensional image to reduce the data volume. However, the data unit compressed by the three-dimensional image compression device each time is quite limited. Therefore, a conversion device is required to convert a piece of large cubic three-dimensional image data to a plurality of pieces of small cubic one-dimensional image data.

When being stored or transmitted, the three-dimensional image information is converted to a data stream, that is, an address is marked on each data of the three-dimensional image information. Firstly, the addresses are marked on the data in sequence along a first dimension, that is, the addresses are marked along a straight line direction. After the information on the straight line is completely marked, the information on a next straight line on the same plane is marked. After all the information on the plane is marked, the information on a next plane is marked continuously. As such, all the data is marked in sequence. Through the marked addresses, the three-dimensional image information is converted to a data stream sequenced according to the marked addresses, and the three-dimensional image information may be stored or transmitted according to the marked addresses.

Before the compression, a large three-dimensional image data is converted to a plurality of pieces of small three-dimensional image data. The small three-dimensional image data crosses a plurality of straight lines and planes. That is, the addresses corresponding to the small three-dimensional image data are distributed quite discretely.

In a data conversion method in the prior art, a buffer memory having a very large memory capacity is used. After the three-dimensional image data is completely stored to the buffer memory, the data corresponding to each small cubic one-dimensional image are fetched. Usually, the capacity of the memory is proportional to the area thereof. Therefore, in order to implement the data conversion method in the prior art, a memory having a large area is required. In addition, at a fixed access speed, the data conversion method in the prior art also has a long latency, thereby affecting the performance of the entire system.

SUMMARY OF THE INVENTION

In view of the above problems, the present invention is a data conversion method and a data conversion device, capable of reducing the use of a memory and lowering a latency during conversion.

The data conversion method and the data conversion device may be used to compress or decompress image data. Compression of the image data is corresponding to decompression of the image data. When being used to compress the mage data, the data conversion method and the data conversion device are used to convert a piece of large cubic three-dimensional image data to a plurality of pieces of small cubic one-dimensional image data. When being used to decompress the image data, the data conversion method and the data conversion device are used to convert a plurality of pieces of small cubic one-dimensional image data to a piece of large cubic three-dimensional image data.

The present invention provides a data conversion method, which comprises the following steps: (A) marking a three-dimensional index $S(x,y,z)$ on data blocks having a size of P units in three-dimensional image data; (B) converting the three-dimensional index $S(x,y,z)$ to a writing sequence index $I_n(t)$; (C) inputting the U data blocks in the three-dimensional image data to a buffer memory in sequence according to the writing sequence index $I_n(t)$; (D) computing a reading sequence index $O_n(t)$ according to the writing sequence index $I_n(t)$; (E) outputting the U data blocks from the buffer memory in sequence according to the reading sequence index $O_n(t)$; and (F) repeating Steps (C), (D), and (E), using the reading sequence index $O_n(t)$ as a next writing sequence index $I_{n+1}(t)$, and inputting next U data blocks in the three-dimensional image data to the buffer memory in sequence according to the writing sequence index $I_{n+1}(t)$, until all the data blocks in the three-dimensional image data are output.

Here, x represents an $x^{th}$ data block in a first direction in the three-dimensional image data, y represents a $y^{th}$ data block in a second direction in the three-dimensional image data, and z represents a $z^{th}$ data block in a third direction in the three-dimensional image data; n represents that the data block is stored in the buffer memory in an $n^{th}$ storage procedure, and t is a time sequence in each storage procedure.

In this embodiment, in Step (A), $P=Wc \times Hc$, where Wc is a unit amount in the first direction when an image compression module executes image compression, and Hc is a unit amount in the second direction when the image compression module executes the image compression.

In Step (A), $U=Wr \times Hr \times Dc$, where Wr represents a number of the data blocks in the first direction in the three-dimensional image data, Hr represents a number of the data blocks in the second direction in the three-dimensional image data, and Dc represents a unit amount in the third direction during the compression.

In Step (B), the three-dimensional index $S(x,y,z)$ is converted to the writing sequence index $I_n(t)$ through:

$$I_{ceil\{z/Dc\}}(\mod \{z-1,Dc\} \times Wr \times Hr + (y-1) \times Wr + (x-1)) = S_{(x,y,z)}$$

where ceil $\{k\}$ represents a minimum integral value greater than or equal to k, and mod $\{p,q\}$ represents a remainder of dividing p by q.

In Step (D) and Step (F), the reading sequence index $O_n(t)$ is computed according to the sequence index $I_n(t)$ through the following relation:

$$O_n(t)=I_n((\text{mod } \{t-1,Dc\})\times Wr\times Hr+\text{ceil}\{t/Dc\})$$

where t is the time sequence.

The present invention also provides a data conversion method, which comprises the following steps: (A) marking a one-dimensional index L(t) on data blocks having a size of P units in a one-dimensional data stream; (B) converting the one-dimensional index L(t) to a writing sequence index $DI_n$(t); (C) inputting the U data blocks in the one-dimensional image data stream to a buffer memory in sequence according to the writing sequence index $DI_n$(t); (D) computing a reading sequence index $DO_n$(t) according to $DI_n$(t); (E) outputting the U data blocks from the buffer memory in sequence according to the reading sequence index $DO_n$(t); and (F) repeating Steps (C), (D), and (E), using the reading sequence index $DO_n$(t) as a next writing sequence index $DI_{n+1}$(t), and inputting next U data blocks in the three-dimensional image data to the buffer memory in sequence according to the writing sequence index $DI_{n+1}$(t), until all the data blocks in the three-dimensional image data are output.

In this embodiment, in Step (A), P=Wc×Hc, where Wc is a unit amount in a first direction when an image compression module executes image compression, and Hc is a unit amount in a second direction when the image compression module executes the image compression.

In the same step, U=Wr×Hr×Dc, where Wr represents a number of the data blocks in the first direction in the three-dimensional image data, Hr represents a number of the data blocks in the second direction in the three-dimensional image data, and Dc represents a unit amount in a third direction when the image compression module executes the image compression.

In Step (B), the one-dimensional index L(t) is converted to the writing sequence index $DI_n$(t) through:

$$DI_{\text{ceil}\{t/(Wr\times Hr\times Dc)\}}(\text{mod } \{t-1,(Wr\times Hr\times Dc)\}+1)=L(t)$$

where ceil {k} represents a minimum integral value greater than or equal to k, and mod {p,q} represents a remainder of dividing p by q.

In Step (D) and Step (F), the reading sequence index $DO_n$(t) is computed according to $DI_n$(t) through the following relation:

$$DO_n(t)=DI_n((\text{mod } \{t-1,Wr\times Hr\}-1)\times Dc+\text{ceil}\{t/Wr\times Hr\})$$

where t is a time sequence.

The present invention provides a data conversion device, which comprises a buffer memory and a controller.

The buffer memory comprises a plurality of data blocks having a size of P units. The controller is used to mark a three-dimensional index on U data blocks having the size of P units in three-dimensional image data, convert the three-dimensional index to a writing sequence index, write the three-dimensional image data to the buffer memory in sequence according to the writing sequence index, convert the writing sequence index to a reading sequence index, and read the data in the buffer memory in sequence according to the reading sequence index.

The present invention further provides a data conversion device, which comprises a buffer memory and a controller.

The buffer memory comprises a plurality of data blocks having a size of P units. The controller is used to mark a three-dimensional index on U data blocks having the size of P units in three-dimensional image data, convert the three-dimensional index to a writing sequence index, write the three-dimensional image data to the buffer memory in sequence according to the writing sequence index, convert the writing sequence index to a reading sequence index, and read the data in the buffer memory in sequence according to the reading sequence index.

In the embodiments according to the present invention, through the data conversion method and the data conversion device, the use of the memory is reduced, and the time for the conversion is lowered.

BRIEF DESCRIPTION OF THE DRAWINGS

The present invention will become more fully understood from the detailed description given herein below for illustration only, and thus are not limitative of the present invention, and wherein:

FIGS. 5A, 5B, 5C, and 5D are schematic views of data conversion according to an embodiment of the present invention;

FIG. 7 is a schematic view of data conversion according to an embodiment of the present invention; and FIGS. 8A, 8B, 8C, and 8D are schematic views of data conversion according to an embodiment of the present invention.

DETAILED DESCRIPTION OF THE INVENTION

Detailed features and advantages of the present invention are described in the embodiments below, and their content is adequate for those skilled in the art to understand the technical content of the present invention and to implement the present invention. According to the content disclosed in the specification, the claims, and the drawings, those skilled in the art can easily understand the objectives and advantages of the present invention. The embodiments below further illustrate the ideas of the present invention in detail, but do not limit the scope of the present invention within any idea.

Figure 1:
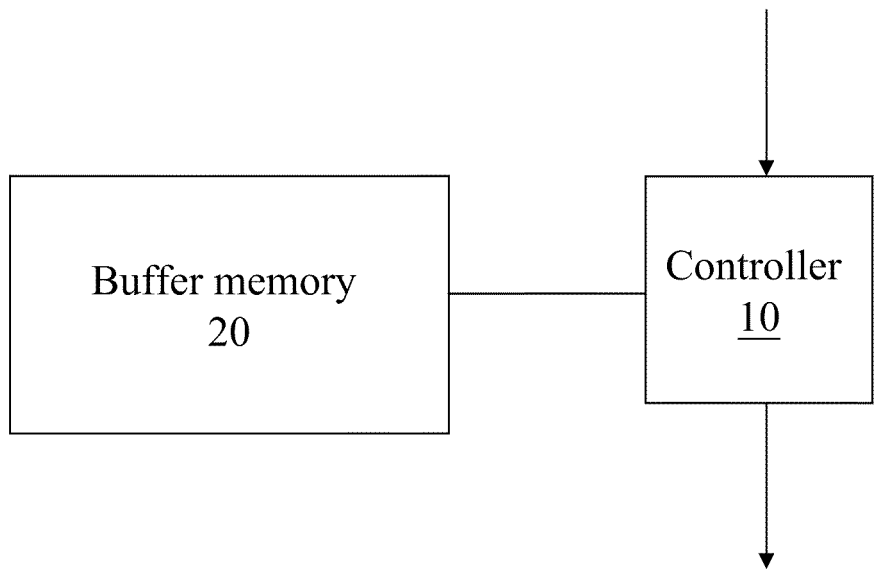
FIG. 1 is a schematic block diagram of an embodiment of the present invention.
Figure 2:
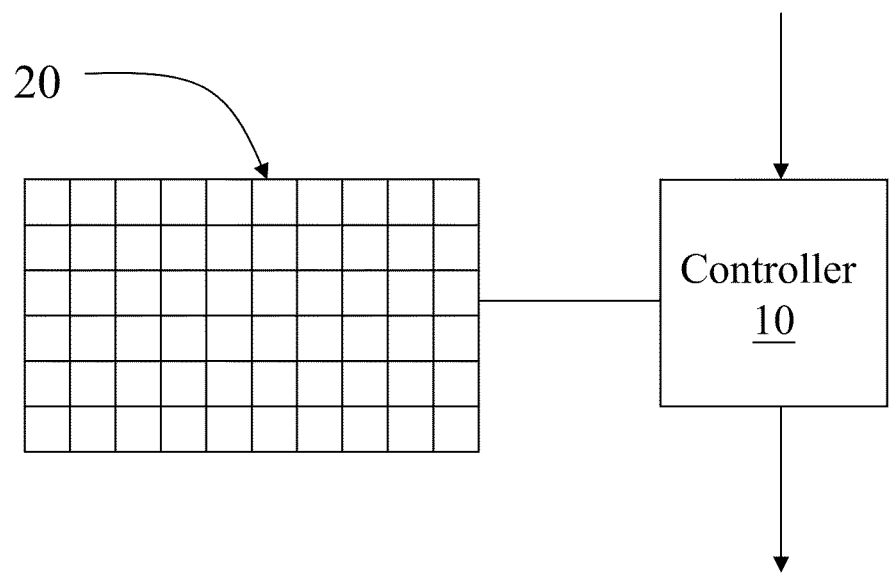
FIG. 2 is a schematic block diagram of an embodiment of the present invention.

FIGS. 1 and 2 are schematic block diagrams of an embodiment of the present invention. Referring to FIGS. 1 and 2, in this embodiment, a large cubic three-dimensional image data is converted to a plurality of pieces of small cubic one-dimensional image data. A data conversion device according to the present invention comprises a controller 10 and a buffer memory 20. The controller 10 is electrically connected to the buffer memory 20.

The buffer memory 20 comprises a plurality of data blocks, and a size of each data block is P units. Each data block is corresponding to an address, so as to facilitate subsequent writing and reading.

Figure 3A:
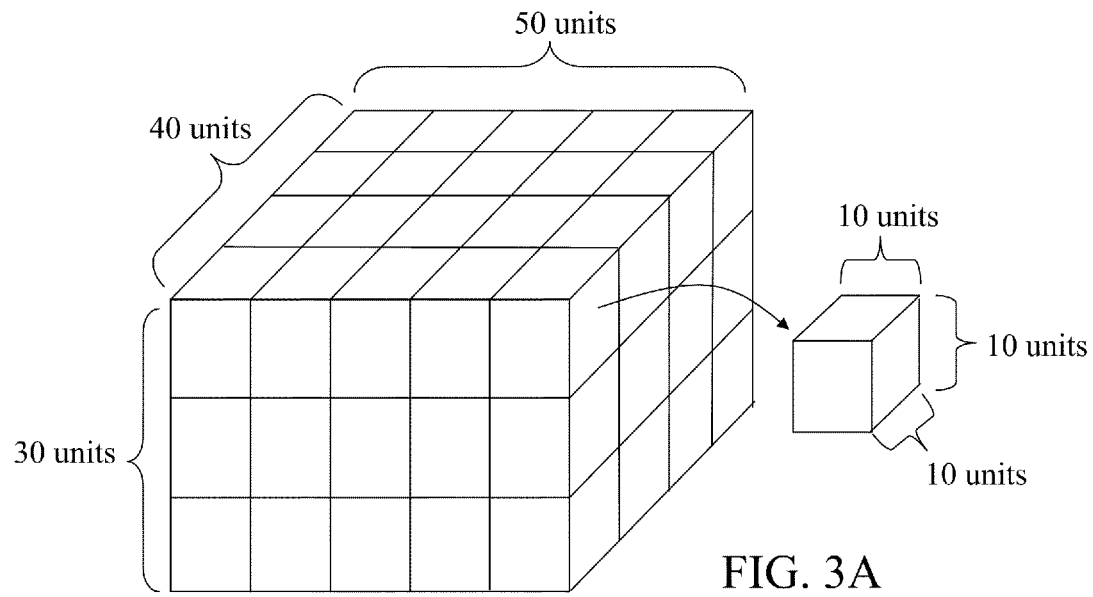
FIGS. 3A and 3B are schematic views of three-dimensional image data according to an embodiment of the present invention.

FIG. 3A is a schematic view of three-dimensional image data according to an embodiment of the present invention. Referring to FIG. 3A, for ease of description, in this embodiment, three-dimensional image data having a size of 50×40×30 units is taken for example. The three-dimensional data used in compression and decompression is 10×10×10 units.

Each data block of the buffer memory 20 is 10×10 units. The unit described here may be at least one bit or byte. The number of bits corresponding to each unit is determined according to a quantizing degree or a quantizing mode. If the units of the three-dimensional image data is not an integral multiple of the units of the three-dimensional data used in the compression and decompression, padding data is added to the three-dimensional image data, such that the units of the three-dimensional image data become an integral multiple of the units of the three-dimensional data used in the compression and decompression. It should be noted that the amount of the units in this embodiment is only illustrative, but the present invention is not thus limited.

Figure 4:
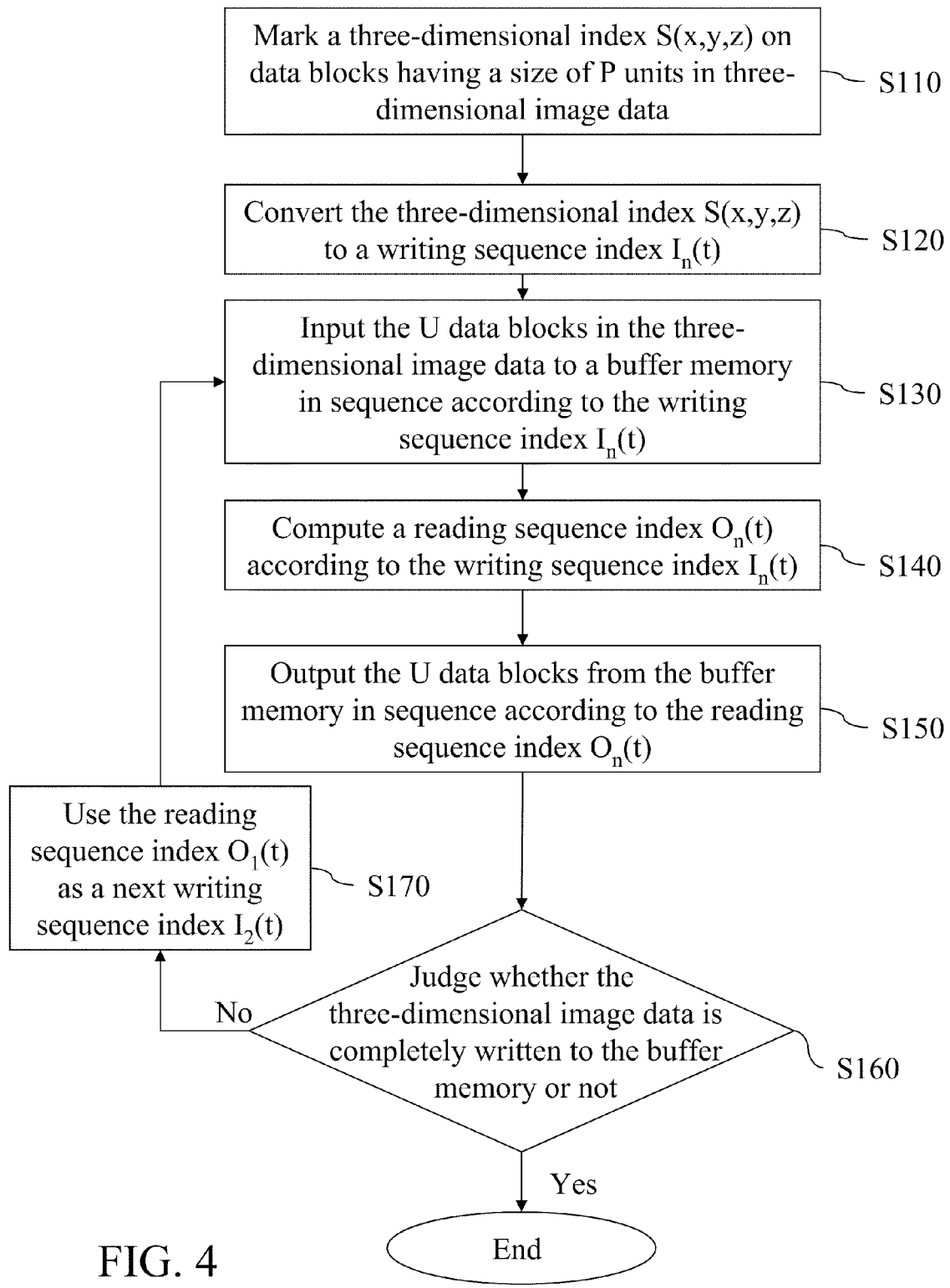
FIG. 4 is a flow chart of an embodiment of the present invention.

FIG. 4 is a flow chart of a data conversion method for three-dimensional image data according to an embodiment of the present invention. Referring to FIG. 4, the controller 10 is used to execute steps in the flow chart. The process comprises the following steps: (S110) marking a three-dimensional index S(x,y,z) on data blocks having a size of P units in three-dimensional image data; (S120) converting the three-dimensional index S(x,y,z) to a writing sequence index $I_n(t)$; (S130) inputting the U data blocks in the three-dimensional image data to the buffer memory in sequence according to the writing sequence index $I_n(t)$; (S140) computing a reading sequence index $O_n(t)$ according to the writing sequence index $I_n(t)$; (S150) outputting the U data blocks from the buffer memory in sequence according to the reading sequence index $O_n(t)$; and (S160) judging whether the three-dimensional image data is completely written to the buffer memory or not, until all the data blocks in the three-dimensional image data are output.

Firstly, in Step S110, the controller 10 marks the three-dimensional index on each data block having the size of P units in the three-dimensional image data. In this embodiment, P is 10×10.

Figure 3B:
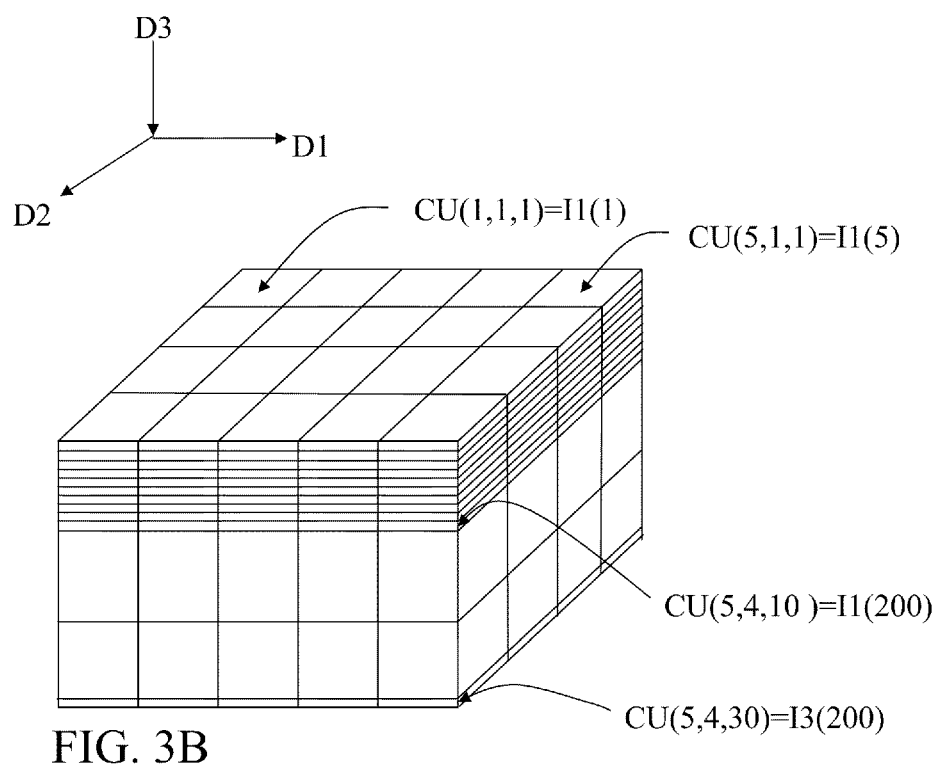

FIG. 3B is a schematic view of marking the three-dimensional index according to the embodiment of the present invention. Each data block having the size of 10×10×1 units has a three-dimensional index CU(x,y,z), where x represents an $x^{th}$ data block in a direction D1 in the three-dimensional image data, y represents a $y^{th}$ data block in a direction D2 in the three-dimensional image data, and z represents a $z^{th}$ data block in a direction D3 in the three-dimensional image data. It should be noted that x, y, and z described herein only represent the sequence index during the storage or reading operation of the buffer memory 20, but do not represent a physical position where the data is actually saved. In addition, x, y, and z described herein are not used to limit a physical capacity of the buffer memory 20. The capacity of the buffer memory 20 only needs to satisfy the access requirements of the data without generating overflow.

In this embodiment, the size of the three-dimensional image data is 50×40×30 units, and the size of the data block is 10×10×1 units. Therefore, 5 data blocks exist in the direction D1, 4 data blocks exist in the direction D2, and 30 data blocks exist in the direction D3. The three-dimensional index of the data block starts from CU(1,1,1), and ends till CU(5,4,30).

Next, in Step S120, the controller 10 converts the three-dimensional index CU(x,y,z) to the writing sequence index $I_n(t)$, where n represents that the data block is stored in the buffer memory 20 in an $n^{th}$ storage procedure, and t represents a time sequence in each storage procedure.

In this step, the controller 10 converts the three-dimensional index CU(x,y,z) to the writing sequence index $I_n(t)$ through:

$I_{ceil\{z/Dc\}}(\text{mod }\{z-1,Dc\}\times Wr\times Hr+(y-1)\times Wr+x)=CU(x,y,z)$, where ceil{k} represents a minimum integral value greater than or equal to k, and mod {p,q} represents a remainder of dividing p by q, Wr represents a number of the data blocks in the first direction in the three-dimensional image data, Hr represents a number of the data blocks in the second direction in the three-dimensional image data, and Dc represents a unit amount in the third direction during the compression. The illustrative unit amounts in this embodiment are known, that is, Wr is 5, Hr is 4, and Dc is 10.

The writing sequence index converted from CU(1,1,1) is $I_{ceil\{1/10\}}(\text{mod }\{0,10\}\times 5\times 4+(1-1)\times 5+1)$, that is, $I_1(1)$. The writing sequence index converted from CU(5,1,1) is $I_{ceil\{1/10\}}(\text{mod }\{0,10\}\times 5\times 4+(1-1)\times 5+5)$, that is, $I_1(5)$. The writing sequence index converted from CU(5,4,10) is $I_{ceil\{10/10\}}(\text{mod }\{9,10\}\times 5\times 4+(4-1)\times 5+5)$, that is, $I_3(200)$. The writing sequence index converted from CU(5,4,30) is $I_{ceil\{30/10\}}(\text{mod }\{29,10\}\times 5\times 4+(4-1)\times 5+5)$, that is, $I_3(200)$.

Next, in Step S130, the controller 10 inputs the U data blocks in the three-dimensional image data to the buffer memory 20 according to the writing sequence index $I_n(t)$. In this embodiment, U is 200.

FIG. 5A shows the writing method. In more detail, the controller 10 firstly writes the data blocks having the writing indexes of $I_1(1), I_1(2), I_1(3), \ldots, I_1(200)$ to the buffer memory 20 in sequence. The writing manner is as follows: the controller 10 writes the data blocks according to addresses of the data blocks in the buffer memory 20.

In Step S140, the controller 10 computes the reading sequence index $O_n(t)$ according to the writing sequence index $I_1(t)$.

In this embodiment, the controller 10 computes the reading sequence index $O_n(t)$ according to the writing sequence index $I_n(t)$ through:

$O_n(t)=I_n((\text{mod }\{t-1,Dc\})\times Wr\times Hr+\text{ceil}\{t/Dc\})$ where t is the time sequence.

According to the illustrative unit amounts in this embodiment, Wr is 5, Hr is 4, and Dc is 10. Therefore, according to the above relation, $O_1(1)=I_1((\text{mod }\{0,10\})\times 20+\text{ceil}\{1/10\})=I_1(1)$. That is, the first data block read in the first reading procedure is equal to the first data block that is written. According to the same method, $O_1(2)=I_1(21)$, $O_1(3)=I_1(61), \ldots, O_1(200)=I_1(200)$. FIG. 5B shows the reading sequence.

The controller 10 operates the sequence when reading the data blocks according to the relation between the writing index and the reading index. The controller 10 may also establish a lookup table of the reading sequence according to the relation, and stores the lookup table in a memory. When each time the controller 10 needs to read the data blocks, the controller reads the data blocks according to the sequence stored in the lookup table. It should be noted that the relation between the writing index and the outputting index is computed before or after the writing step, or computed synchronously when the writing step is executed. That is, execution sequences of Step S130 and Step S140 may be exchanged.

In Step S150, the controller 10 outputs the U data blocks from the buffer memory 20 in sequence according to the reading sequence index $O_1(t)$. The buffer memory 20 may simultaneously or alternately perform the storage action and the outputting action. That is, Step S130 and Step S150 may be simultaneously or alternately executed. The outputting action and the storage action may be simultaneously performed, such that no interruption exists between outputting and storage.

In Step S160, the controller 10 judges whether the three-dimensional image data is completely written to the buffer memory 20.

If the three-dimensional image data is not completely written to the buffer memory 20, the controller 10 executes Step S170: using the reading sequence index $O_1(t)$ as a next writing sequence index $I_2(t)$.

Referring to FIGS. 5C and 5D, this step is described in further detail. The first data block written in the second writing procedure is equal to the first data block read in the first reading procedure. Therefore, $I_2(1)=O_1(1)=I_1(1)$, $I_2(2)=O_1(2)=I_1(21)$, and $I_2(3)=O_1(3)=I_1(61)$ .... That is, Step S130 is repeated by using another writing index. The previous writing sequence index $I_1(t)$ is no longer used, so a space for storing the writing sequence index may be repeatedly used for storage. In other words, the storage space used by the new writing sequence index $I_2(t)$ may cover the storage space of the original writing sequence index $I_1(t)$. As such, the memory space for storing the writing sequence index may be significantly reduced.

As long as the data in one data block is read, the data block may be used to access the next data. That is, as long as the buffer memory 20 does not generate the overflow or data loss when the data is read or written, it is unnecessary to read or store different data in the same sequence.

Then, Steps S140 and S150 are repeated. Here, the operation method is the same as Steps S140 and S150 described above. If the three-dimensional image data is completely written to the buffer memory 20, the method ends.

Through the data conversion method for three-dimensional image data according to this embodiment, a large cubic three-dimensional image data is converted to a plurality of pieces of small cubic one-dimensional image data.

The present invention further provides a data conversion device, and a data conversion method applicable to the device, capable of converting a plurality of pieces of small cubic one-dimensional image data to a large cubic three-dimensional image data.

In this embodiment, the device used here is as shown in the schematic views of FIGS. 1 and 2. The data conversion device according to the present invention comprises a controller 10 and a buffer memory 20. The controller 10 is electrically connected to the buffer memory 20.

The buffer memory 20 comprises a plurality of data blocks, and a size of each data block is P units. Each data block is corresponding to an address, so as to facilitate subsequent writing and reading.

In this embodiment, 60 pieces of three-dimensional image data having a size of 10×10×10 units are taken for example. Each data block of the buffer memory is 10×10 units. The unit described here may be at least one bit or byte. The number of bits corresponding to each unit is determined according to a quantizing degree or a quantizing mode.

Figure 6:
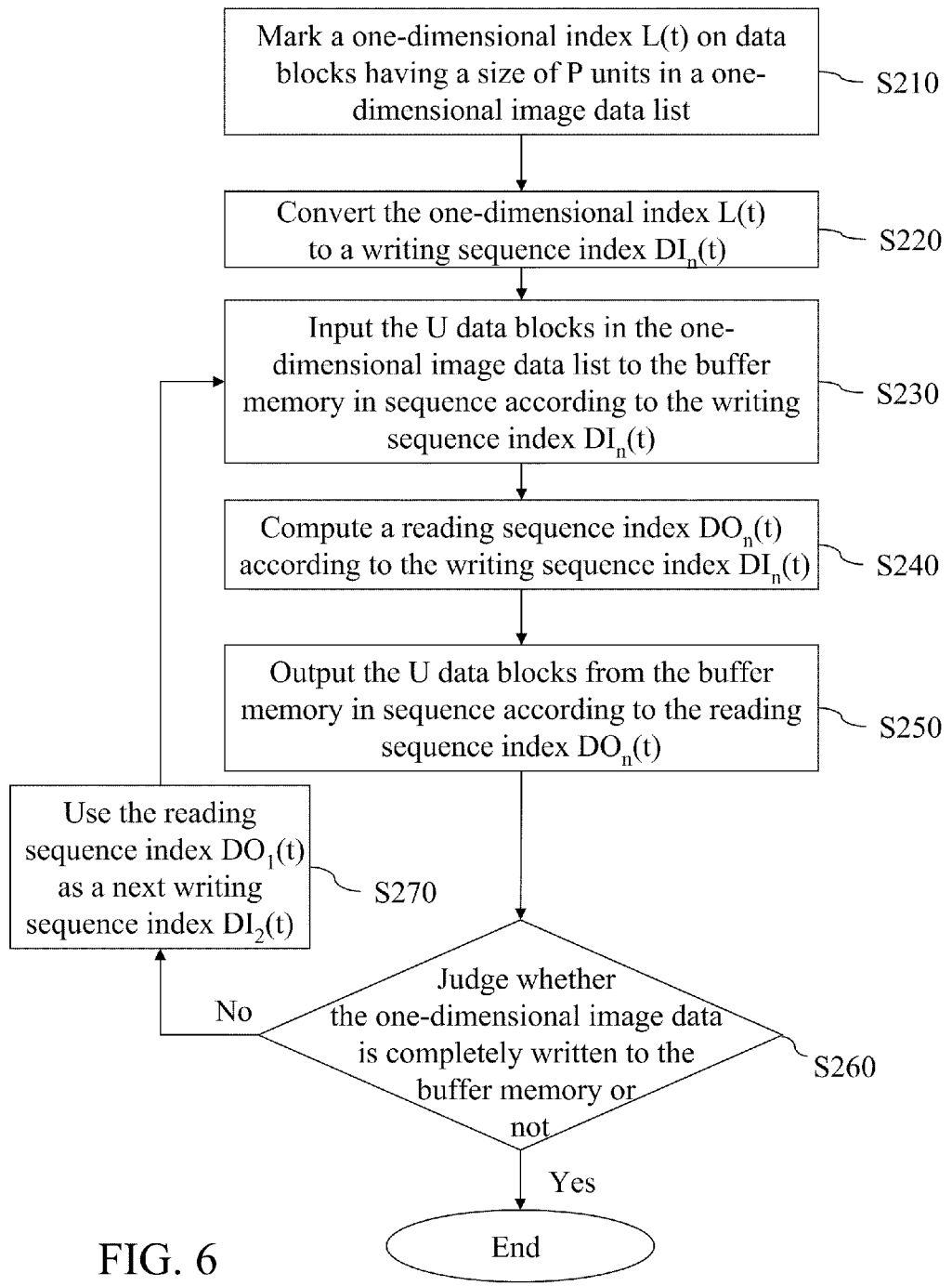
FIG. 6 is a flow chart of an embodiment of the present invention.

FIG. 6 is a flow chart of a data conversion method for one-dimensional image data according to an embodiment of the present invention. Referring to FIG. 6, the controller 10 is used to execute steps in the flow chart. The process comprises the following steps: (S210) marking a one-dimensional index L(t) on data blocks having a size of P units in a one-dimensional image data stream; (S220) converting the one-dimensional index L(t) to a writing sequence index $DI_n(t)$; (S230) inputting the U data blocks in the one-dimensional image data stream to the buffer memory in sequence according to the writing sequence index $DI_n(t)$; (S240) computing a reading sequence index $DO_n(t)$ according to the writing sequence index $DI_n(t)$; (S250) outputting the U data blocks from the buffer memory in sequence according to the reading sequence index $DO_n(t)$; and (S260) judging whether the one-dimensional image data is completely written to the buffer memory or not, until all the data blocks in the one-dimensional image data are output.

Firstly, in Step S210, the controller 10 marks the one-dimensional index L(t) on each data block having the size of P units in the one-dimensional image data stream.

Figures 7, 8A:
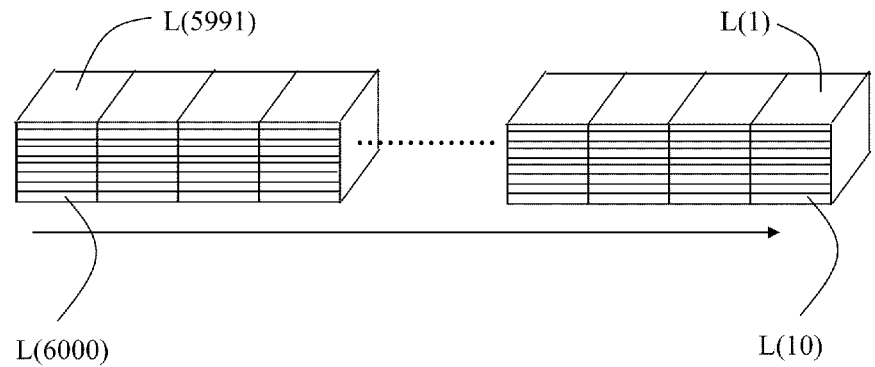

Referring to FIG. 7, 60 pieces of three-dimensional image data having the size of 10×10×10 units are cut into 6000 data blocks having the size of 10×10. The corresponding one-dimensional indexes are L(1), L(2), ..., L(6000).

Next, in Step S220, the controller 10 converts the one-dimensional index L(t) to the writing sequence index $DI_n(t)$.

In this embodiment, the controller 10 converts the one-dimensional index L(t) to the writing sequence index $I_n(t)$ through:

$$DI_{ceil\{t/(Wr \times Hr \times Dc)\}}(\mathrm{mod}\ \{t-1,(Wr \times Hr \times Dc)\}+1)=L(t)$$

where ceil {k} represents a minimum integral value greater than or equal to k, and mod {p,q} represents a remainder of dividing p by q, Wr represents a number of the data blocks in a first direction in the three-dimensional image data, Hr represents a number of the data blocks in a second direction in the three-dimensional image data, and Dc represents a unit amount in the third direction during the compression. The illustrative unit amounts in the embodiment are known, that is, Wr is 5, Hr is 4, and Dc is 10.

The writing sequence index converted from L(1) is $DI_{ceil\{1/200\}}(\mathrm{mod}\ \{0,200\}+1)$, that is, $DI_1(1)$. The writing sequence index converted from L(2) is $DI_{ceil\{1/200\}}(\mathrm{mod}\ \{1,200\}+1)$, that is, $DI_1(2)$. The writing sequence index converted from L(201) is $DI_{ceil\{201/200\}}(\mathrm{mod}\ \{200,200\}+1)$, that is, $DI_2(1)$. The writing sequence index converted from the last one-dimensional index L(6000) is $DI_{ceil\{6000/200\}}(\mathrm{mod}\ \{5999,200\}+1)$, that is, $DI_{300}(200)$.

Referring to FIG. 8A, next, in Step S230, the controller 10 inputs the U data blocks in the one-dimensional image data stream to the buffer memory 20 according to the writing sequence index $DI_n(t)$. In this embodiment, U is 200.

Then, in Step S240, the controller 10 computes the reading sequence index $DOn(t)$ according to the writing sequence index $DIn(t)$. It should be noted that a relation between the writing sequence index $DIn(t)$ and the reading sequence index $DOn(t)$ is computed before or after the writing step is executed, or computed synchronously when the writing step. That is, execution sequences of Step S230 and Step S240 may be exchanged, and the steps of different storage procedures do not need to be performed in the above sequence.

In this embodiment, the controller 10 computes the reading sequence index $DO_n(t)$ according to the writing sequence index $DI_n(t)$ through the following relation:

$$DO_n(t)=DI_n((\mathrm{mod}\ \{t-1,Wr \times Hr\}-1) \times Dc+ceil\{t/Wr \times Hr\})$$

where t is a time sequence.

Referring to FIG. 8B, according to the illustrative unit amounts in this embodiment, Wr is 5, Hr is 4, and Dc is 10. Therefore, according to the above relation, $DO_1(1)=DI_1((\mathrm{mod}\ \{0,20\}) \times 10+ceil\{1/20\})=DI_1(1)$. That is, the first data block read in the first reading procedure is equal to the first data block that is written. According to the same method, $DO_1(2)=DI_1((\mathrm{mod}\ \{1,20\}) \times 10+ceil\{2/20\})=DI_1(11)$, $DO_1(3)=DI_1(21)$, ..., and $DO_1(200)=DI_1(200)$.

Next, in Step S250, the controller 10 outputs the U data blocks from the buffer memory 20 in sequence according to the reading sequence index $DO_1(t)$. The buffer memory 20 may simultaneously or alternately perform the storage action and the outputting action. That is, Step S230 and Step S250 may be simultaneously or alternately executed. The outputting action and the storage action may be simultaneously performed, such that no interruption exists between outputting and storage. In Step S260, the controller 10 judges whether the one-dimensional image data is completely written to the buffer memory 20.

If the one-dimensional image data is not completely written to the buffer memory 20, the controller 10 executes Step S270: using the reading sequence index $DO_1(t)$ as a next writing sequence index $DI_1(t)$. The previous writing sequence index $DI_1(t)$ is no longer used, so a space for storing the writing sequence index may be repeatedly used for storage. In other words, the storage space used by the new writing sequence index $DI_1(t)$ may cover the storage space of the original writing sequence index $DI_1(t)$. As such, the memory space for storing the writing sequence index may be significantly reduced.

Referring to FIGS. 8C and 8D, the step is described in further detail. The first data block written in the second writing procedure is equal to the first data block read in the first reading procedure. Therefore, $DI_2(1)=DO_1(1)=DI_1(1)$, $DI_2(2)=DO_1(2)=I_1(11)$, $DI_2(3)=DO_1(3)=DI_1(21)$ . . . . That is, Step S230 is repeated by using another writing index.

Then, Steps S240 and S250 are repeated. Here, the operation method is the same as Steps S240 and S250 described above.

If the three-dimensional image data is completely written to the buffer memory 20, the method ends.

Through the data conversion method for one-dimensional image data according to this embodiment, the data blocks are read in sequence, such that a plurality of pieces of small cubic one-dimensional image data is converted to a piece of large cubic three-dimensional image data.

To sum up, the data conversion method and the data conversion device are used to convert a piece of large cubic three-dimensional image data to a plurality of pieces of small cubic one-dimensional image data, or convert a plurality of pieces of small cubic one-dimensional image data to a piece of large cubic three-dimensional image data, so as to reduce the use of the memory and lower the time for conversion.

What is claimed is:

1. A data conversion method, for converting a three-dimensional image data to a one-dimensional image data, applicable to storage and reading of a buffer memory, the data conversion method comprising:
   (A) marking a three-dimensional index $CU(x,y,z)$ on U data blocks in the three-dimensional image data, wherein a size of each data block is P units, x represents an $x^{th}$ data block in a first direction in the three-dimensional image data, y represents a $y^{th}$ data block in a second direction in the three-dimensional image data, and z represents a $z^{th}$ data block in a third direction in the three-dimensional image data;
   (B) converting the three-dimensional index $CU(x,y,z)$ to a writing sequence index $I_n(t)$, wherein n represents that the data block is stored in the buffer memory in an $n^{th}$ storage procedure, and t represents a time sequence in each storage procedure;
   (C) inputting the U data blocks in the three-dimensional image data to the buffer memory in sequence according to the writing sequence index $I_n(t)$;
   (D) computing a reading sequence index $O_n(t)$ according to the writing sequence index $I_n(t)$;
   (E) outputting the U data blocks from the buffer memory in sequence according to the reading sequence index $O_n(t)$; and
   (F) repeating Steps (C), (D), and (E), using the reading sequence index $O_n(t)$ as a next writing sequence index $I_{n+1}(t)$, and inputting next U data blocks in the three-dimensional image data to the buffer memory in sequence according to the writing sequence index $I_{n+1}(t)$, until all the data blocks in the three-dimensional image data are output.

2. The data conversion method according to claim 1, wherein in Step (A), $P=Wc \times Hc$, Wc is a unit amount in the first direction when an image compression module executes image compression, and Hc is a unit amount in the second direction when the image compression module executes the image compression.

3. The data conversion method according to claim 2, wherein in Step (C), $U=Wr \times Hr \times Dc$, Wr represents a number of the data blocks in the first direction in the three-dimensional image data, Hr represents a number of the data blocks in the second direction in the three-dimensional image data, and Dc represents a unit amount in the third direction in the compression.

4. The data conversion method according to claim 3, wherein in Step (B), the three-dimensional index $CU(x,y,z)$ is converted to the writing sequence index $I_n(t)$ through:

$$I_{ceil\{z/Dc\}}(\mod \{z-1,Dc\} \times Wr \times Hr + (y-1) \times Wr + x) = CU(x,y,z);$$

wherein ceil$\{k\}$ represents a minimum integral value greater than or equal to k, and mod $\{p,q\}$ represents a remainder of dividing p by q.

5. The data conversion method according to claim 4, wherein in Step (D), the reading sequence index $O_n(t)$ is computed according to the sequence index $I_n(t)$ through a following relation:

$$O_n(t) = I_n((\mod \{t-1,Dc\}+1) \times Wr \times Hr + \text{ceil}\{t/Dc\});$$

wherein t is the time sequence.

6. A data conversion method, for converting a one-dimensional image data to a three-dimensional image data, applicable to storage and reading of a buffer memory, the data conversion method comprising:
   (A) marking a one-dimensional index $L(t)$ on U data blocks in the one-dimensional data, wherein a size of each data block is P units;
   (B) converting the one-dimensional index $L(t)$ to a writing sequence index $DI_n(t)$, wherein n represents that the data block is stored in the buffer memory in an $n^{th}$ storage procedure, and t represents a time sequence in each storage procedure;
   (C) inputting the U data blocks in the one-dimensional image data to the buffer memory in sequence according to the writing sequence index $DI_n(t)$;
   (D) computing a reading sequence index $DO_n(t)$ according to the writing sequence index $DI_n(t)$;
   (E) outputting the U data blocks from the buffer memory in sequence according to the reading sequence index $DO_n(t)$; and
   (F) repeating Steps (C), (D), and (E), using the reading sequence index $DO_n(t)$ as a next writing sequence index $DI_{n+1}(t)$, and inputting next U data blocks in the one-dimensional image data to the buffer memory in sequence according to the writing sequence index $DI_{n+1}(t)$, until all the data blocks in the one-dimensional image data are output.

7. The data conversion method according to claim 6, wherein in Step (A), $P=Wc \times Hc$, Wc is a unit amount in a first direction when an image decompression module executes image decompression, and Hc is a unit amount in a second direction when the image compression module executes the image decompression.

8. The data conversion method according to claim 7, wherein in Step (B), U=Wr×Hr×Dc, Wr represents a number of the data blocks in the first direction in the three-dimensional image data, Hr represents a number of the data blocks in the second direction in the three-dimensional image data, and Dc represents a unit amount in a third direction in the compression.

9. The data conversion method according to claim 8, wherein in Step (B), the one-dimensional index L(t) is converted to the writing sequence index $DI_n(t)$ through:

$$DI_{ceil\{t/(Wr \times Hr \times Dc)\}}(\mod \{t-1,(Wr \times Hr \times Dc)\}+1)=L(t);$$

wherein ceil{k} represents a minimum integral value greater than or equal to k, and mod {p,q} represents a remainder of dividing p by q.

10. The data conversion method according to claim 9, wherein in Step (D), the reading sequence index $DO_n(t)$ is computed according to the writing sequence index $DI_n(t)$ through a following relation:

$$DO_n(t)=DI_n((\mod \{t-1,Wr \times Hr\}) \times Dc+ceil\{t/Wr \times Hr\});$$

wherein t is the time sequence.

11. A data conversion device, for converting a three-dimensional image data to a one-dimensional image data, comprising:

a buffer memory, comprising at least U data blocks, wherein a size of the data block is P units, wherein P and U are expressed as $$P=Wc \times Hc, \text{ and}$$

$$U=Wr \times Hr \times Dc,$$

where Wc represents a unit amount in a first direction when an image decompression module executes image decompression, Hc represents a unit amount in a second direction when the image decompression module executes the image decompression, Dc represents a unit amount in a third direction when the image decompression module executes the image decompression, Wr represents a number of the data blocks in the first direction in the three-dimensional image data, and Hr represents a number of the data blocks in the second direction in the three-dimensional image data; and a controller configured to mark a three-dimensional index L(t) on each of the data blocks, convert the three-dimensional index CU(x,y,z) to a writing sequence index $I_n(t)$, write three-dimensional image data to the buffer memory in sequence according to the writing sequence index $I_n(t)$, convert the writing sequence index $I_n(t)$ to a reading sequence index, and read the data in the buffer memory in sequence according to the reading sequence index, wherein the controller converts the three-dimensional index CU(x,y,z) to the writing sequence index $I_n(t)$ according to a following relation:

$$I_{ceil\{z/Dc\}}(\mod \{z-1,Dc\} \times Wr \times Hr+(y-1) \times Wr+x)=CU(x,y,z),$$

where $I_n(t)$ is the writing sequence index, and represents that the data block is stored in the buffer memory at a $t^{th}$ time sequence in an $n^{th}$ storage procedure, x represents an $x^{th}$ data block in the first direction in the three-dimensional image data, y represents a $y^{th}$ data block in the second direction, z represents a $z^{th}$ data block in the third direction, ceil {k} represents a minimum integral value greater than or equal to k, and mod {p,q} represents a remainder of dividing p by q.

12. The data conversion device according to claim 11, wherein the controller converts the writing sequence index to the reading sequence index according to a following relation:

$$O_n(t)=I_n((\mod \{t-1,Dc\}+1) \times Wr \times Hr+ceil\{t/Dc\});$$

wherein $O_n(t)$ represents that the data block is read from the buffer memory at the $t^{th}$ time sequence in the $n^{th}$ storage procedure.

13. The data conversion device according to claim 12, wherein the controller converts the writing sequence index to the reading sequence index according to a following relation:

$$I_{n+1}(t)=O_n(t);$$

wherein $I_{n+1}(t)$ represents that the data block is stored in the buffer memory at a $t^{th}$ time sequence in an $n+1^{th}$ storage procedure.

14. A data conversion device for converting a one-dimensional image data to a three-dimensional image data, comprising:

a buffer memory, comprising at least U data blocks, wherein a size of the data block is P units, wherein P and U are:

$$P=Wc \times Hc, \text{ and}$$

$$U=Wr \times Hr \times Dc,$$

where Wc represents a unit amount in a first direction when an image decompression module executes image decompression, Hc represents a unit amount in a second direction when the image decompression module executes the image decompression, Dc represents a unit amount in a third direction when the image decompression module executes the image decompression, Wr represents a number of the data blocks in the first direction in the three-dimensional image data, and Hr represents a number of the data blocks in the second direction in the three-dimensional image data; and a controller configured to mark a one-dimensional index L(t) on each of the data blocks in a one-dimensional data, convert the one-dimensional index L(t) to a writing sequence index $DI_n(t)$ that the data block is stored in the buffer memory at a $t^{th}$ time sequence in an $n^{th}$ storage procedure, write the one-dimensional data to the buffer memory in sequence according to the writing sequence index $DI_n(t)$, convert the writing sequence index $DI_n(t)$ to a read sequence index, and reading the data in the buffer memory in sequence according to the reading sequence index, wherein the controller converts the one-dimensional index L(t) to the writing sequence index $DI_n(t)$ according to a following relation:

$$DI_{ceil\{t/(Wr \times Hr \times Dc)\}}(\mod \{t,(Wr \times Hr \times Dc)\})=L(t),$$

where $DI_n(t)$ is the writing sequence index and represents that the data block is stored in the buffer memory at a $t^{th}$ time sequence in an $n^{th}$ storage procedure, t represents a $t^{th}$ data block in the one-dimensional image data, ceil {k} represents a minimum integral value greater than or equal to k, and mod {p,q} represents a remainder of dividing p by q.

15. The data conversion device according to claim 14, wherein the controller converts the one-dimensional index to the writing sequence index according to a following relation:

$$DO_n(t)=DI_n((\mod \{t-1,Wr \times Hr\}) \times Dc+ceil\{t/Wr \times Hr\});$$

wherein $DO_n(t)$ represents that the data block is read from the buffer memory at the $t^{th}$ time sequence in the $n^{th}$ storage procedure.

16. The data conversion device according to claim 15, wherein the controller converts the writing sequence index to the reading sequence index according to a following relation:

$$DI_{n+1}(t)=DO_n(t);$$

wherein $DI_{n+1}(t)$ represents that the data block is stored in the buffer memory at a $t^{th}$ time sequence in an $n+1^{th}$ storage procedure.

* * * * *